(12) United States Patent
Sankaran (10) Patent No.: US 7,991,865 B2
(45) Date of Patent: Aug. 2, 2011

(54) METHOD AND SYSTEM FOR DETECTING CHANGES IN A NETWORK USING SIMPLE NETWORK MANAGEMENT PROTOCOL POLLING

(75) Inventor: Ganesh Chennimalai Sankaran, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 759 days.

(21) Appl. No.: 11/440,325

(22) Filed: May 23, 2006

(65) Prior Publication Data

US 2007/0276932 A1 Nov. 29, 2007

(51) Int. Cl.
*G06F 15/177* (2006.01)
(52) U.S. Cl. ......................... 709/223; 370/254
(58) Field of Classification Search ............... 709/223
See application file for complete search history.

(56) References Cited

U.S. PATENT DOCUMENTS

| | | | | |
|---|---|---|---|---|
| 5,968,185 | A * | 10/1999 | Bressoud et al. | 714/10 |
| 6,061,750 | A * | 5/2000 | Beardsley et al. | 710/74 |
| 6,151,684 | A * | 11/2000 | Alexander et al. | 714/4 |
| 6,219,705 | B1 * | 4/2001 | Steinberger et al. | 709/224 |
| 6,308,328 | B1 * | 10/2001 | Bowcutt et al. | 725/111 |
| 6,539,540 | B1 * | 3/2003 | Noy et al. | 717/141 |
| 6,728,768 | B1 * | 4/2004 | Carney | 709/224 |
| 7,047,289 | B1 * | 5/2006 | Gopal | 709/223 |
| 2002/0032761 | A1 * | 3/2002 | Aoyagi et al. | 709/223 |
| 2002/0035626 | A1 * | 3/2002 | Higuchi | 709/223 |
| 2003/0125063 | A1 * | 7/2003 | Svensson et al. | 455/517 |
| 2003/0208574 | A1 * | 11/2003 | Chen et al. | 709/223 |
| 2005/0010580 | A1 * | 1/2005 | Lancefield | 707/100 |
| 2005/0165834 | A1 * | 7/2005 | Nadeau et al. | 707/103 R |
| 2006/0184613 | A1 * | 8/2006 | Stienessen et al. | 709/203 |

OTHER PUBLICATIONS

Seung-hyun Park, Myong-soon Park, "An Efficient Transmission for Large MIB Tables in Polling-based SNMP," Feb. 23-Mar. 1, 2003, IEEE, 246-252.*
Cheikhrouhou, M.; Labetoulle, J.; An efficient polling layer for SNMP; Network Operations and Management Symposium, 2000. NOMS 2000; Apr. 10-14, 2000. pp. 477-490.
Haskin, Dimitry and Onishi, Steve; Management Information Base for IP Version 6:ICMPv6 Group; Jan. 12, 1998; found at http://www3.ietf.org/proceedings/98aug/I-D/draft-ietf-ipngwg-ipv6-icmp-mib-02.txt.
RFC 1493; Jul. 1993; found at http://rfc.slim.summitmedia.co.uk/rfc1493.html.

* cited by examiner

*Primary Examiner* — Ian N Moore
*Assistant Examiner* — Bobae K Cheney
(74) *Attorney, Agent, or Firm* — Fish & Richardson P.C.

(57) ABSTRACT

In an embodiment, methods and systems have been provided for detecting changes in a network using improved Simple Network Management Protocol (SNMP) polling that reduces network traffic. Examples of changes in the network include, but are not limited to, configuration and behavioral changes in a network device, and response of network device to a network change. A Network Management Station (NMS) periodically polls Management Information Base (MIB) groups instead of periodically polling individual MIB object instances. The NMS receives the Aggregate Change Identifiers (ACIs) of MIB groups in response to polling, from a SNMP agent. The changes in the received ACIs represent the changes in the MIB groups. A change in an MIB group represents changes in the MIB object instances of the MIB group. The ACIs can be checksum, timestamp, and a combination of number of MIB object instances in a group and checksum of the MIB group.

17 Claims, 5 Drawing Sheets

METHOD AND SYSTEM FOR DETECTING CHANGES IN A NETWORK USING SIMPLE NETWORK MANAGEMENT PROTOCOL POLLING

BACKGROUND OF THE INVENTION

1. Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Field of the Invention

Embodiments of the present invention relate, in general, to network management. More specifically, embodiments of the present invention relate to methods and systems for monitoring Management Information Base (MIB) for use with network management protocols.

3. Description of the Background Art

A Network Management Station (NMS) monitors and administers network devices in a network using application layer protocols such as a Simple Network Management Protocol (SNMP). The NMS gathers information about the changes in the network devices to monitor and administer the network devices. The information about the changes such as configuration and behavioral changes in a network device, and response of network devices to a network change, constitute management information of the network devices. A software module such as an SNMP agent running on the network device provides management information of the network device to the NMS using Management Information Bases (MIBs). The MIBs are present in the network device. An MIB includes a large number of variables known as MIB objects. The NMS monitors the objects lead to changes in the network devices and consequently, the changes in the network.

According to conventional methods, the NMS may use asynchronous and synchronous monitoring mechanisms, to monitor the changes in the MIB objects. One such example of asynchronous monitoring is an SNMP-trap mechanism. In the SNMP-trap mechanism, the network device sends SNMP traps to the NMS if the MIB objects are changed. However, it is possible that in some cases, the SNMP traps are not received by the NMS. As a result, the SNMP-trap mechanism is not completely reliable. Further, the SNMP-trap mechanism is applicable when a trap for a change in the MIB object is defined at the time of defining the MIB object. Moreover, the SNMP trap-mechanisms require highly available NMS.

In another asynchronous monitoring mechanism, the NMS may use Remote Monitoring (RMON) to monitor the changes in the MIB objects. However, the RMON uses a large memory of the network devices for monitoring the MIB objects. As a result, the RMON is not suitable for monitoring a huge list of the MIB objects.

In another conventional method, the NMS may use SNMP polling as a synchronous monitoring mechanism for monitoring the changes in the MIB objects. In SNMP polling, the NMS periodically polls the MIB objects. The periodic polling of each MIB object results in detecting changes in the MIB objects that have occurred between two subsequent time-periods. SNMP polling is more reliable in comparison to asynchronous mechanisms. Moreover, SNMP polling does not require highly-available NMS. However, the SNMP polling of each MIB object generates a large amount of SNMP traffic in the network. Moreover, the SNMP polling of each MIB object is not useful when no changes are detected in the MIB objects. As a result, the method of SNMP polling of each MIB object has to be optimized to avoid the generation of a large amount of traffic in the network.

DETAILED DESCRIPTION OF EMBODIMENTS OF THE INVENTION

Embodiments of the present invention provide methods, systems, and computer-readable media for detecting changes in a network using improved Simple Network Management Protocol (SNMP) polling that reduces the network traffic. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the present invention provide a method and system for detecting changes in a network using improved Simple Network Management Protocol (SNMP) polling that reduces network traffic. In operation, Network Management Station (NMS) periodically polls Management Information Base (MIB), which is a collection of management information about network devices. The MIB includes a large number of variables known as MIB objects. Changes in the MIB objects indicate the occurrence of changes in the network devices. An SNMP agent provides management information of a network device in the form of changes in the MIB objects. The NMS monitors the changes in the network devices by monitoring the changes in the MIB objects. The changes in the network devices lead to changes in the network.

In an embodiment of the present invention, the NMS monitors Aggregate Change Identifiers (ACIs) of a group of MIB object instances instead of monitoring each of the MIB object instances. A change in an ACI of an MIB group of the MIB object instances indicates a change in at least one MIB object instance of the MIB group. As a result, the NMS polls only those MIB object instances for which a change is detected in the ACI of their MIB group. If no change is detected in an ACI of an MIB group, then the MIB object instances of the MIB group are not polled. As a result, there is a decrease in the number of the MIB object instances polled by the NMS to detect the changes in the network. Moreover, the traffic generated in the network can be quite reduced. At the SNMP agent, there is a huge reduction in the number of SNMP packets that are constructed and processed during the polling of each of the MIB object instances present in the network. Further, the time taken by the NMS to detect the changes in the network is also reduced.

Figure 1:
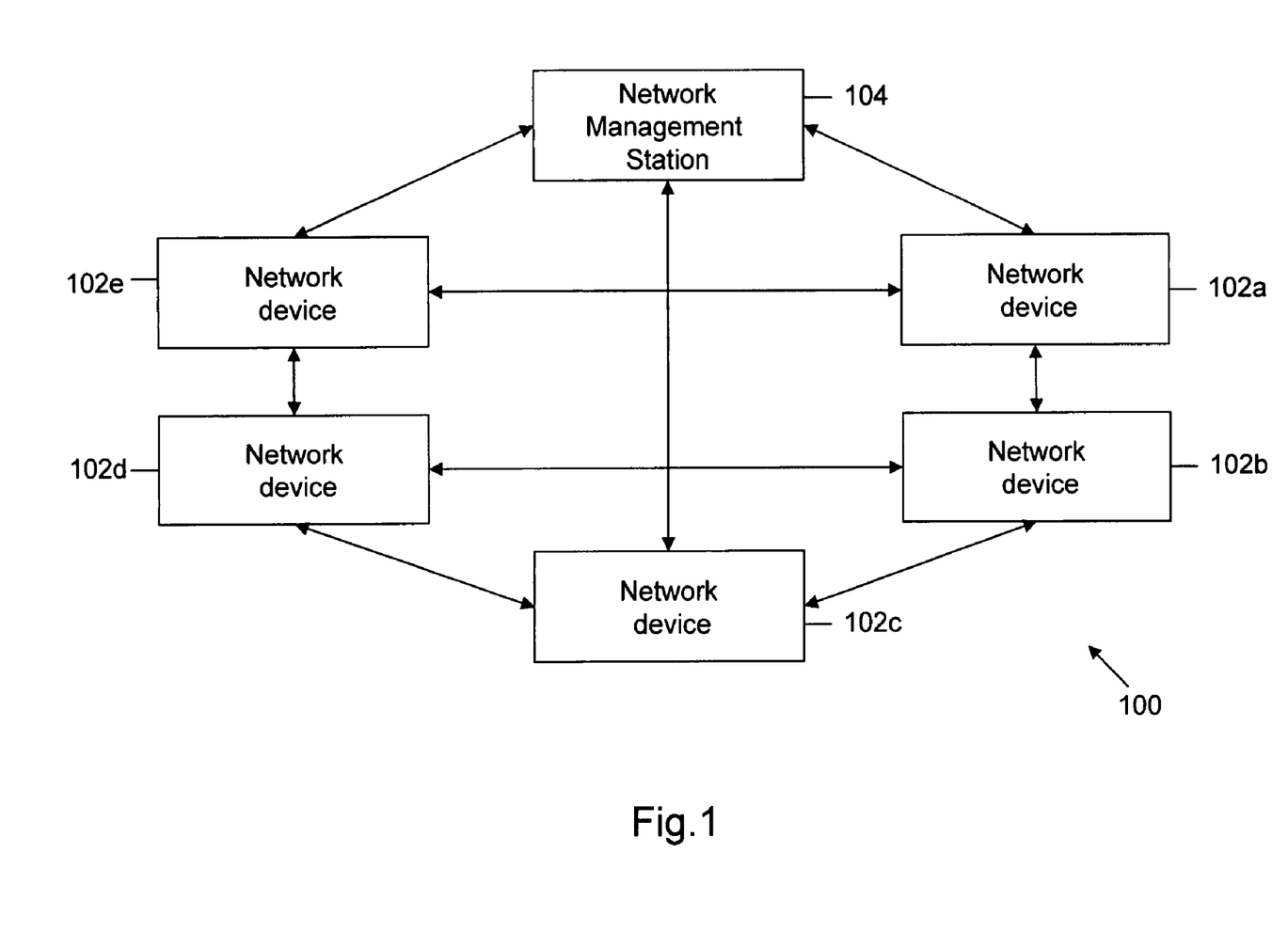
FIG. 1 illustrates an environment, wherein embodiments of the present invention can be performed.

Referring now to drawings, more particularly by their reference numbers, FIG. 1 illustrates an environment, wherein embodiments of the present invention can be performed. The environment includes a network 100. Network 100 includes network devices 102a, 102b, 102c, 102d, and 102e, hereinafter collectively referred to as network devices 102. Network 100 further includes a Network Management Station (NMS) 104. NMS 104 is a system for monitoring and administering network devices 102 in network 100. NMS 104 updates itself by continuously monitoring the changes taking place in network devices 102. Examples of network devices 102 include, but are not limited to, gateways, routers, firewalls, repeaters, bridges, and switches. Network devices 102 can be connected in various network topologies such as ring, tree, star, bus, mesh, and so forth.

In accordance with an embodiment of the present invention, NMS 104 monitors network 100 by periodically polling management information of network devices 102. Management information includes information related to changes in network devices 102. The changes can be due to the static changes in network 100 or the changes in the operational environment of network 100. Accordingly, the changes in network devices 102 lead to changes in the way traffic is transported across network 100. Examples of changes in network devices 102 include, but are not limited to, configuration or behavioral changes in network devices 102, and response of network devices 102 to a change in the configuration of network 100. The behavioral change of network devices 102 can be, for example, a new entry in the routing table of network devices 102. Further, the response of network devices 102 to a change in network 100 can be due to, for example a link partner such as a network device 102a at the other end of a wire or across a portion of network 100 going down during an auto-negotiation, to detect the various modes that exist in network device 102b on the other end of the wire. Each link partner advertises it own abilities to automatically configure the highest performance mode of interoperation. For example, network devices 102a and 102b may be link partners. If one of the link partners malfunction, network operational parameters can degrade as traffic may be routed along other paths.

Moreover, NMS 104 can also detect the changes in network devices 102 that are related, but not limited to Virtual Large Area Networks (VLANs), port-to-VLANs association, spanning-tree states, channel states, and interface operational states. Further, the management information of network devices 102 is included in Management Information Bases (MIBs). A MIB includes a large number of variables known as MIB objects. The changes in the MIB objects may or may not represent the changes in network devices 102. For example, changes in MIB objects like traffic counters may not represent changes in network devices 102.

Figure 2:
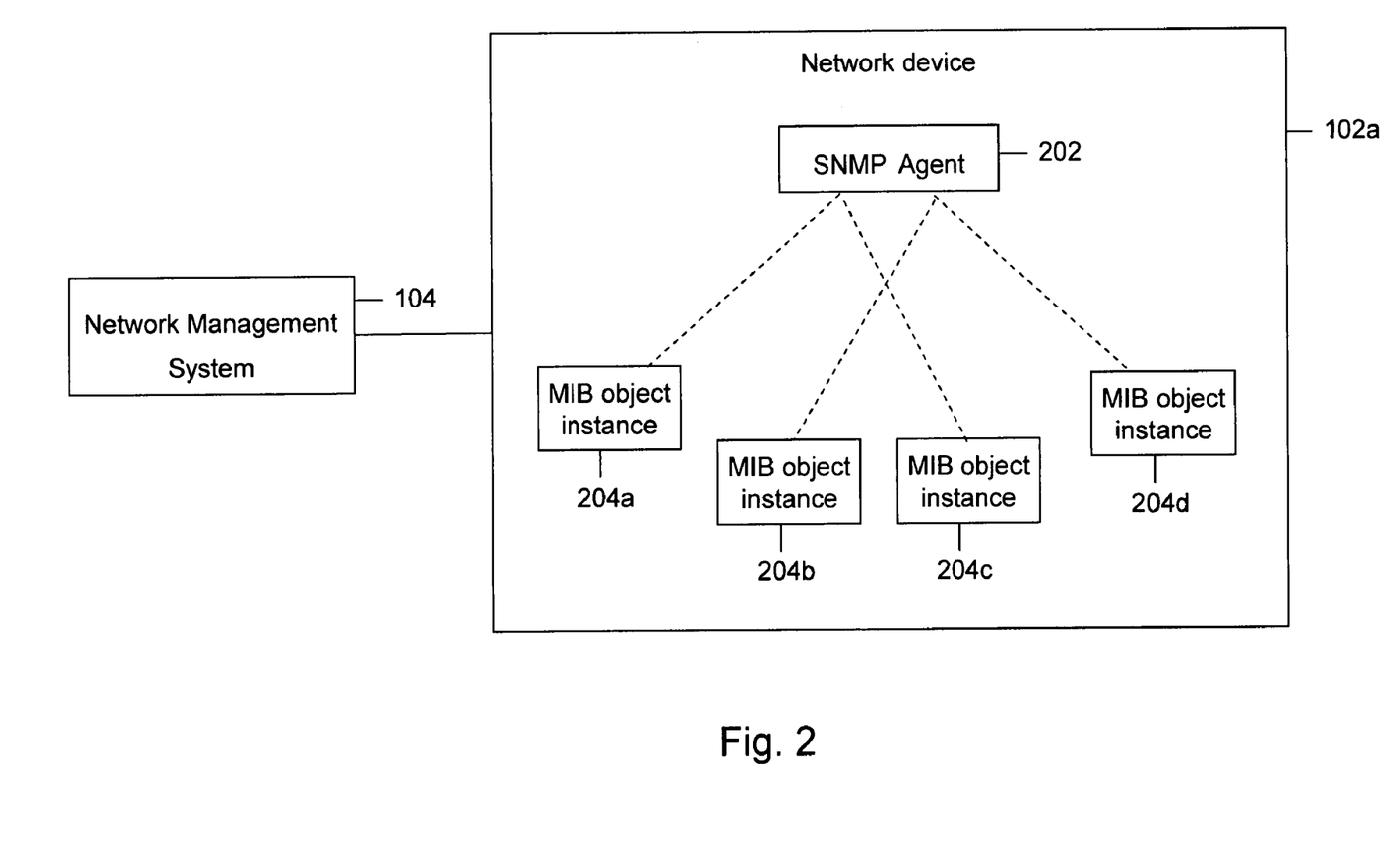
FIG. 2 illustrates a network device and a Network Management Station (NMS) in accordance with an embodiment of the present invention.

FIG. 2 illustrates a representative network device, such as network device 102a and NMS 104, in accordance with an embodiment of the present invention. Network device 102a includes a Simple Network Management Protocol (SNMP) agent 202 and MIB object instances 204a, 204b, 204c, and 204d, hereinafter collectively referred to as MIB object instances 204. MIB object instances 204 are a collection of management information about network device 102a. The definition for the management information has been explained earlier. The changes in MIB object instances 204 indicate the changes in network device 102a.

Accordingly, if NMS 104 is interested in detecting changes in network device 102a, then NMS 104 sends requests to SNMP agent 202 for detecting changes in MIB object instances 204. SNMP agent 202 is a process running on network device 102a that interfaces with MIB object instances 204. Further, SNMP Agent 202 is an application that performs the operational role of receiving requests from NMS 104. SNMP agent 202 receives the requests, processes the requests, and sends responses to NMS 104 in form of SNMP packets. The responses may include information about the value of MIB object instances 204. Further, the process of sending requests to SNMP agent 202 and receiving responses from SNMP agent 202 is hereinafter, collectively referred to as polling. In an embodiment of the present invention, NMS 104 is also referred to as an SNMP manager.

For example, NMS 104 may poll 100s of MIB object instances 204 present on each of thousands of network devices 102, in order to detect the changes in network 100. However, polling each of MIB object instances 204 present in network 100 results in generation of large amount of SNMP traffic in network 100. Moreover, NMS 104 takes large amount of time in polling each of MIB object instances 204 in order to detect the changes in network 100.

To reduce the polling of each of MIB object instances 204 in network 100, MIB object instances 204 are grouped together to form at least one MIB group. NMS 104 poll an MIB group. In response to a poll request of the MIB group, SNMP agent 202 sends an Aggregate Change Identifier (ACI) of the MIB group to NMS 104. NMS 104 checks for a change in the received ACI. The change in the received ACIs indicates a change in the MIB group. MIB object instances 204 of the MIB group can be further polled to detect the changes in network devices 102.

Figure 3:
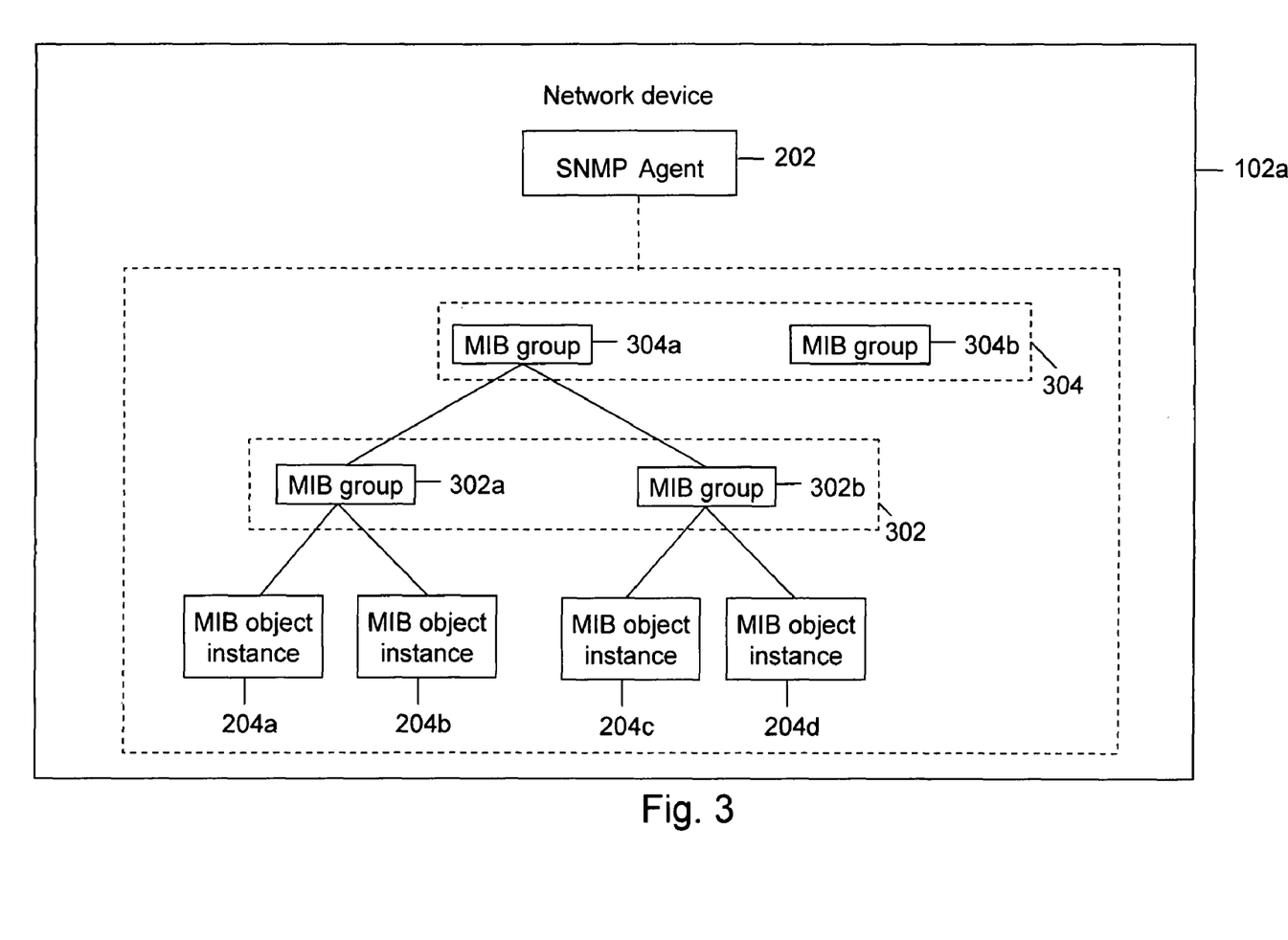
FIG. 3 illustrates MIB groups in accordance with an embodiment of the present invention.

FIG. 3 illustrates MIB groups in accordance with an embodiment of the present invention. MIB object instances 204 are grouped together to form MIB groups 302a and 302b, hereinafter collectively referred to as MIB groups 302. MIB group 302a includes MIB object instances 204a and 204b. Similarly, MIB group 302b includes MIB object instances 204c and 204d. MIB object instances 204 are grouped on the basis of MIB definition. The MIB definitions are object group definitions that list MIB object instances 204 present in MIB groups 302. For example, the MIB definition defines or list down MIB object instances 204a and 204b for MIB group 302a.

In an embodiment of the present invention, MIB groups 302 may also be grouped to form MIB groups 304. For the purpose of illustration, only two such MIB groups 304a and 304b are shown. Also, MIB group 304b may include MIB groups 302. However, for the purpose of illustration, MIB groups 302 of MIB group 302b are not shown. Similarly, MIB group 304a can include a large number of MIB groups 302. For the purpose of illustration, only two such MIB groups 302 are shown. Further, each MIB group from MIB groups 302 may include more or fewer than the two illustrated MIB object instances 204.

However, the formation of MIB groups 304 is possible, but is not essential to carry out all the embodiments of the present invention. Similarly, MIB group 304a can be grouped with other MIB group 304b to form a higher level of grouping. The formation of groups within groups depends on the implementation of the various embodiments of the present invention. As a result, MIB object instances 204 and MIB groups 302 and 304 may form a multi-level hierarchy of MIB object instances 204.

In network device 102a, SNMP agent 202 interfaces with MIB object instances 204 and MIB groups 302 and 304. As a result, SNMP agent 202 can poll each of MIB object instances 204 as well as MIB groups 302 and 304.

In an embodiment of the present invention, an MIB group such as MIB group 302a is formed by grouping MIB object instances 204 that do not change under the normal operation of network device 102a. For example, MIB object instances 204 such as timers and counters that change due to traffic flow are preferably not grouped as they often change during the normal operation of network device 102a. Moreover, the changes in MIB object instances 204, that are time or traffic dependent does not account to the changes NMS 104 is looking for. However, MIB object instance 204a is a right candidate for grouping if at least one change in MIB object instance 204a is due to a configuration or behavioral change in network device 102a, or if the response of network device 102a is due to a change in network 100.

MIB object instance 204a is the right candidate for grouping if at least one of the changes in MIB object instance 204a does not wholly depend on time. At least one of the changes in MIB object instance 204a must indicate a configuration change of network device 102a, a behavioral change in network device 102a such as a new entry in a routing table or response of network device 102a to a change in network 100. To illustrate, consider the change in MIB object instance 'dotIdStpPortState' that is defined in RFC1493-MIB, the disclosure of which is incorporated herein by reference. Although the transition from a 'listening' to 'forwarding' state is solely dependent on time, the transition from 'forwarding' to any other state is dependent upon topology changes in network 100. As one change in MIB object instance is not time dependent, this MIB object instance is the right candidate for grouping and can be grouped.

In another embodiment of the present invention, a user can also define MIB groups 302 and 304. For example, in one embodiment, editable table rows are provided for network administrators to define MIB groups 302 and 304. The formation of MIB group 304 from MIB groups 302 should also comply with grouping conditions that are explained above.

In an embodiment of the present invention, NMS 104 periodically polls MIB group 302a instead of periodically polling each of MIB object instances 204. SNMP agent 202 can compute an ACI of MIB group 302a in response to the poll request of MIB group 302a by NMS 104. Examples of the ACIs may include a checksum of MIB group 302a, a timestamp of MIB group 302a, and a combination of the number of MIB object instances 204 and checksum of the corresponding MIB group 302a. An ACI can be a 32 or 64 byte word in memory associated with MIB group 302a. However, the length of an ACI byte word may vary according to the implementation of the various embodiments of the present invention.

An example of textual convention for an ACI is provided below to illustrate the ACI:
Textual Conventions
AggregateChangeIdentifier::=TEXTUAL-CONVENTION
  STATUS current
  DESCRIPTION
    "Aggregate change identifier for the set of objects mentioned as part of the objects clause. The change identifier can either be a) time stamp indicating the last change of any of the instances of the set of objects as mentioned in objects clause
    b) checksum computed on the set of objects as mentioned in the objects clause
    c) a combination of number of objects and checksum on the set of objects as mentioned in objects clause.
    The checksum algorithms if used can be standard based or proprietary but the same algorithm needs to be used consistently across device reboots so that the checksum computation is consistent."
SYNTAX OCTET STRING A change in the ACI of MIB group 302a indicates a change in at least one of MIB object instances 204 of MIB group 302a. It will be appreciated that further polling of MIB object instances 204 may be required or desired when a change is detected in the ACI of MIB group 302a.

In an embodiment of the present invention, NMS 104 polls MIB group 304a. A change in the ACI of MIB group 304a indicates a change in at least one of MIB groups 302. As a result, NMS 104 polls MIB groups 302 to detect the changed MIB groups 302. If a change is detected in the ACI of MIB group 302a, then NMS 104 polls MIB object instances 204 of MIB group 302a. For example, if 10,000 MIB object instances 204 are grouped to form 100 MIB groups 302, then 100 MIB groups 302 can be further grouped in 10 MIB groups 304. If NMS 104 is interested in detecting the changes in each of 10,000 MIB object instances 204, then NMS 104 can start polling MIB groups from the highest level of multi-level hierarchy and can come down to polling of few MIB object instances 204. As a result, the concept of multi-level hierarchy helps in localizing the changed MIB object instances 204 easily.

Figure 4:
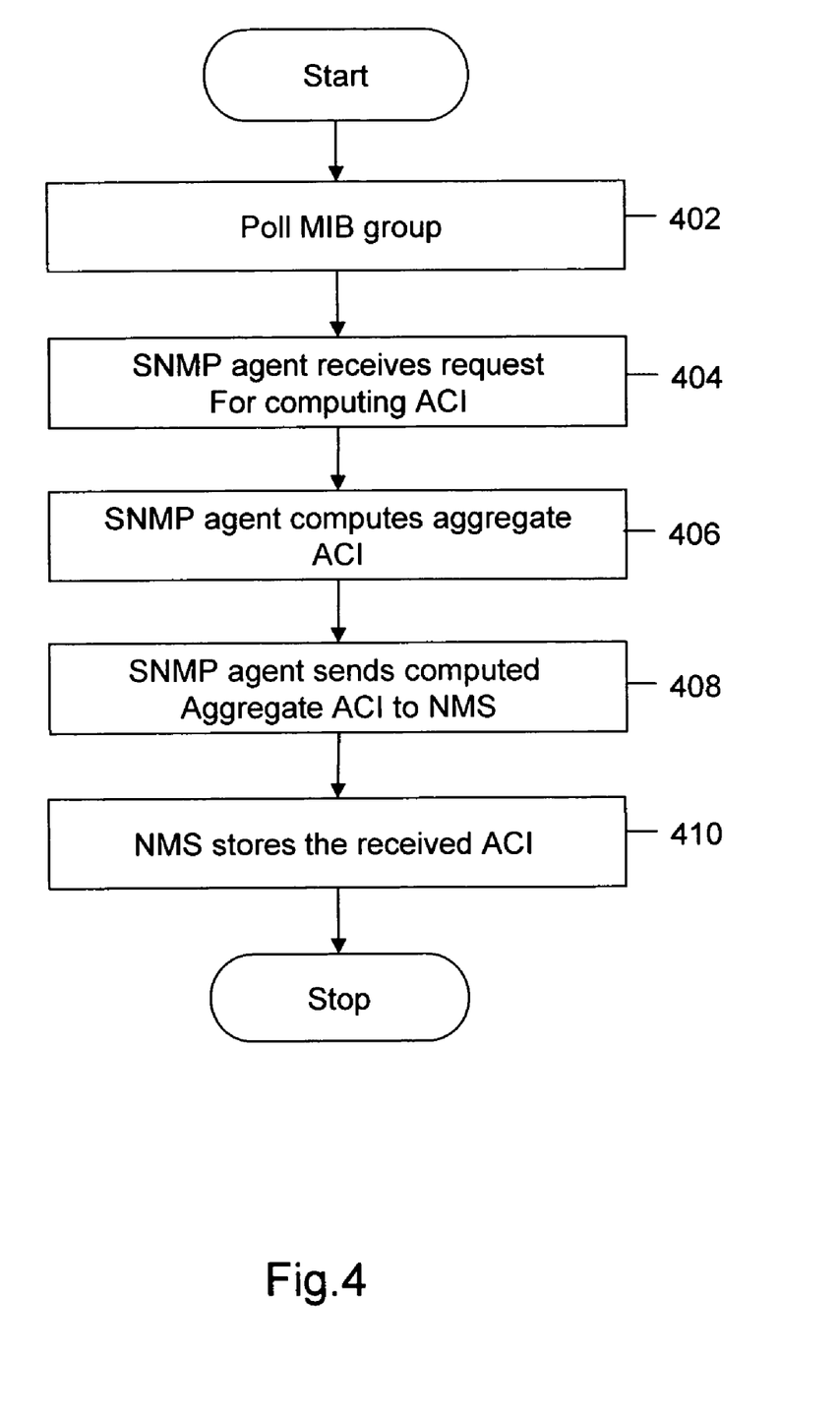
FIG. 4 is a flowchart illustrating a method for polling an MIB group in accordance with an embodiment of the present invention.

The method of periodically polling an MIB group such as MIB group 302a is explained in detail in conjunction with FIG. 4.

FIG. 4 is a flowchart illustrating a method for periodically polling MIB group 302a in accordance with an embodiment of the present invention. At 402, NMS 104 polls MIB group 302a in order to detect changes in MIB group 302a. At 404, SNMP agent 202 receives the request for detecting changes in MIB group 302a. At 406, SNMP agent 202 computes an ACI of MIB group 302a. At 408, SNMP agent 202 sends the computed ACI of MIB group 302a to NMS 104 in form of SNMP packets. At 410, NMS 104 stores the received ACI. NMS 104 processes the SNMP packets in order to detect the changes in the received ACI. The received ACI persists at NMS 104 until the next polling of MIB group 302a occurs.

In accordance with an embodiment of the present invention, SNMP agent 202 computes the ACI of MIB group 302a, each time it receives a poll request for MIB group 302a. However, if no changes have occurred in MIB object instance 302a, then the ACI of MIB group 302a also remains unchanged. As a result, SNMP agent 202 can send an ACI computed in a previous polling to NMS 104 in response to a poll request for MIB group 302a. However, if MIB group 302a is changed since previous polling, then SNMP agent 202 again computes the ACI of MIB group 302a. Moreover, SNMP agent 202 computes the ACI of MIB group 302a only when it receives the poll request for MIB group 302a.

In an embodiment of the present invention, an incremental checksum is an aggregation technique that is primarily applicable to large sets of MIB groups where computation of an ACI such as checksum in response to a small change in network device 102a is expensive. For example, consider a configuration change taking place in network device 102a. The configuration in totality may be represented by 1000

MIB groups 302 that are part of a MIB group such as MIB group 304a. Therefore, SNMP agent 202 computes the checksum of 1000 MIB groups 302 when it receives the poll request for MIB group 304a. However, if the configuration change has resulted in a change in only a $10^{th}$ MIB group such as MIB group 302a, then there is no need to re-compute the checksum of all 1000 MIB groups 302. The checksum is computed incrementally only for MIB group 302a on the basis of a checksum computed for MIB group 302a in a previous polling. MIB group 302a is marked as 'dirty' as a change has occurred in MIB group 302a. SNMP agent 202 computes the incremental checksum for 'dirty' MIB group 302a with reference to an already computed checksum in a previous polling of MIB group 302a. Also, an already computed checksum of MIB group 302a is marked as 'invalid' if some part of the memory of MIB group 302a is marked as 'dirty'. The already computed checksum that is marked as 'invalid' is then used to compute the incremental checksum of MIB group 302a in a subsequent polling. SNMP agent 202 computes the incremental checksum as an ACI of MIB group 302a and sends to NMS 104. As a result, the computation of the incremental checksum is useful in reducing the time taken to compute a checksum of a large number of MIB object instances 204 at periodic intervals of time.

Figure 5:
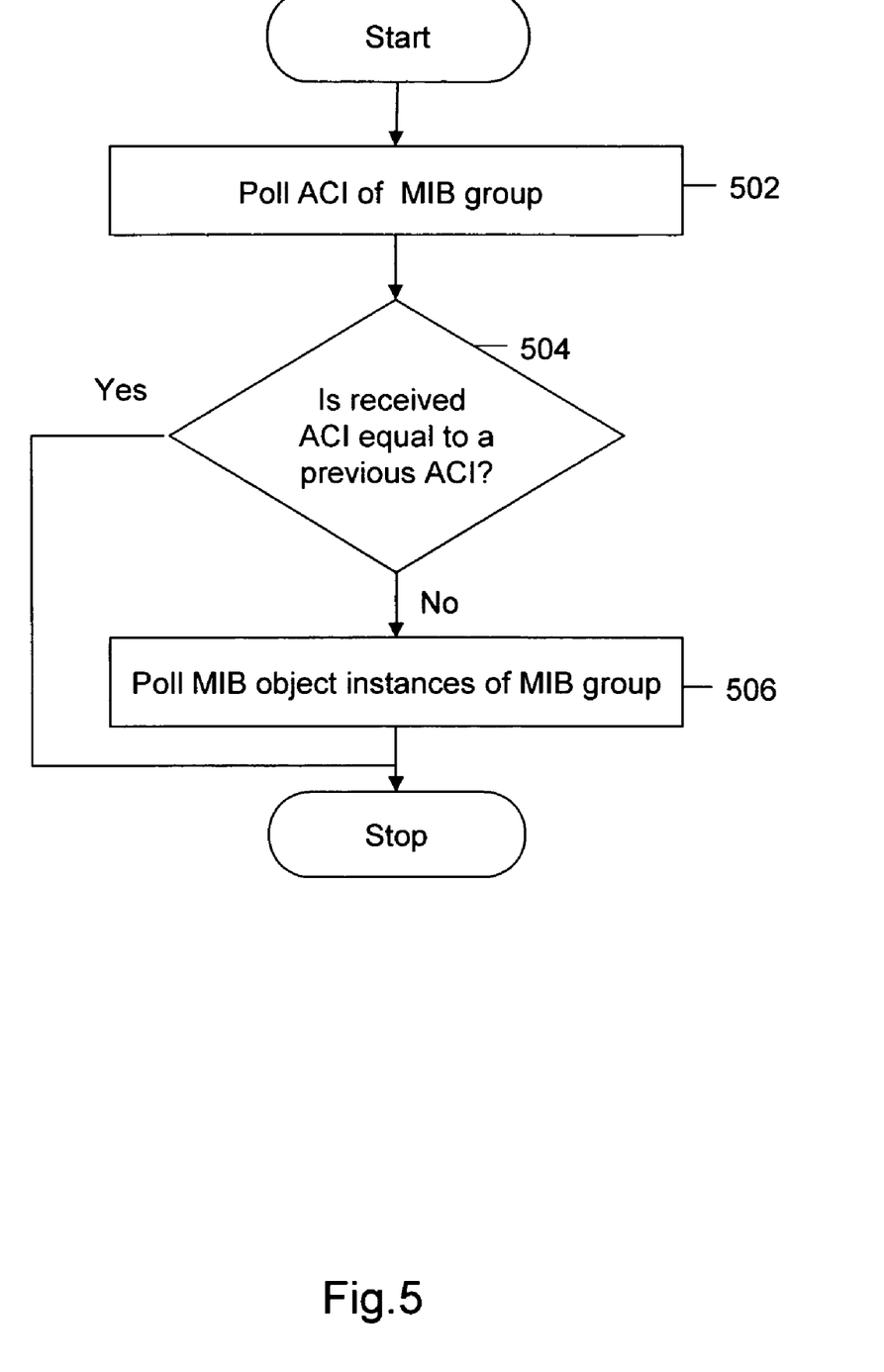
FIG. 5 is a flowchart illustrating a method for detecting a changed MIB group in accordance with an embodiment of the present invention.

A method for detecting a changed MIB group 302a using the received ACI is explained in detail in conjunction with FIG. 5, which illustrates a flowchart of a method for detecting a changed MIB group 302a, in accordance with an embodiment of the present invention. At 502, NMS 104 polls MIB group 302a. As explained earlier, SNMP agent 202 computes and sends the ACI of MIB group 302a to NMS 104 in form of SNMP packets. At 504, NMS determines if value of the received ACI is equal to a previous ACI. The previous ACI is the ACI that has been polled in a previous SNMP polling. The previous ACI is persisted at NMS 104 until next polling. The previous ACI and the received ACI are computed for MIB group 302a by SNMP agent 202. If the received ACI is equal to the previous ACI, it implies that no changes have taken place in MIB object instances 204 since previous polling. This means that network 100 and network device 102 remain at an unchanged operating level. Accordingly, there is no need to poll MIB object instances 204.

However, if the received ACI of MIB group 302a is not equal to the previous ACI of MIB group 302a, then, at 506, MIB object instances 204 of MIB group 302a are polled to detect the changed MIB object instances 204.

A method for detecting whether MIB group 302a has changed or not has been explained with the help of following exemplary MIB definition:

--- ifOperStateChgId AggregateChangeIdentifier
OBJECTS {
  ifOperStatus
}
STATUS   current
DESCRIPTION
   " Aggregate change identifier for all instances of ifOperStatus available on the network device."
   ::= { ifChgId 1 }

---

Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved. In the above mentioned exemplary MIB definition, 'ifOperStatus' is MIB group 302a and 'ifOperStateChgId' is an ACI of MIB group 302a. MIB group 302a includes MIB object instances 204.

In accordance with an embodiment of the present invention, if the received ACI is not equal to the previous ACI of the MIB object instance, then, NMS 104 polls the MIB object instances to detect changed MIB object instances. The changed MIB object instances reflect the changes in network device 102a and network 100.

In an embodiment of the present invention, MIB group 304a can be a tabular MIB object including a large list of MIB object instances 204. In case, a change is detected in the ACI of MIB group 304a, NMS 104 has to poll each of MIB object instances 204. The polling of each of MIB object instances 204 results in an increase in SNMP traffic in network 100. Moreover, the time taken by NMS 104 to detect changes in network device 102a is also increased. In an embodiment of the present invention, MIB object instances 204 are grouped to form MIB groups 302. MIB object instances 204 are grouped to form MIB groups 302 on the basis of a table-compression factor. The table-compression factor is equal to the number of MIB object instances 204 that are grouped to form MIB group 302a or 302b. For example, if the table-compression factor is 1:100, then 100 MIB object instances 204 of a table are grouped to form MIB group 302a. Similarly, next 100 MIB object instances 204 of the table are grouped to form MIB group 302b. The table-compression factor is defined in the MIB definition. The ACIs of MIB groups 302a and 302b can have an object name similar to that of the ACI of the tabular MIB object but should have different indices. An index of MIB group 302a is equal to a product of the table-compression factor and total number of groups. The total number of groups is obtained by adding one to the number of MIB groups preceding MIB group 302a. The polling of the tabular MIB object is furthered explained with the help of the following exemplary MIB definition:

--- ifOperStateRangeChgId AggregateChangeIdentifier
OBJECTS {
  ifOperStatus
}
STATUS   current
DESCRIPTION
   "Aggregate change identifier for a set of instances from the start of the table in lexicographical order of ifOperStatus available on the network device."

---

TABLE-COMPRESSION-FACTOR 1:100 indicates that for every 100 instances from start of the table there will be an instance in the ifOperStateRangeChgId::={ifChgId 1}

Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved. In the above-mentioned MIB definition, 'ifOperStatus' is the tabular MIB object and 'ifOperStateRangeChgId' is an ACI of the tabular MIB object.

In accordance with an embodiment of the present invention, MIB group 304a is hereinafter referred to as the tabular MIB object. The table-compression factor mentioned in the above example is 1:100. As a result, 100 MIB object instances 204 from the beginning of a table of the tabular MIB object can be grouped to form MIB group 302a. Further, next 100

MIB object instances 204 can be grouped to form MIB group 302b. The table-compression factor is illustrative only and is not to be construed as the only acceptable table-compression factor. Typically, the determination of the table-compression factor is based on engineering considerations. The object name of the ACIs of MIB groups 302 is similar to that of the ACI of the tabular MIB object but they have different indices. MIB groups 302 are polled by NMS 104. If a change is detected in the ACI of MIB group 302a, then NMS 104 can poll MIB object instances 204 of MIB group 302a. The changes in at least one of the changed MIB object instances 204 reflect the changes in network device 102a and network 100.

In accordance with an embodiment of the present invention, NMS 104 can poll MIB groups 302a and 302b together. In response to a poll request for MIB groups 302a and 302b, SNMP agent 202 sends an ACI of MIB groups 302a and 302b. The ACI of MIB groups 302a and 302b is the ACI of MIB object instances 204 of MIB groups 302a and 302b. In case, if a change is detected in the ACI of MIB groups 302a and 302b, then, NMS 104 polls MIB object instances 204 of MIB groups 302a and 302b. 302. The change is detected in an ACI if the received ACI is not equal to the previous ACI. The polling of MIB groups 302a and 302b by NMS 104 has been explained with the help of following exemplary MIB definition:

```
Example: Multiple objects for change identification
ifStateChgId AggregateChangeIdentifier
    OBJECTS {
        ifOperStatus,
        ifSpeed
    }
    STATUS   current
    DESCRIPTION
        "Aggregate change identifier for all instances of MIB objects
        as mentioned in the objects clause."
    ::= { ifChgId 1 }
```

Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved. In the above-mentioned exemplary MIB definition, 'ifOperStatus' is MIB group 302a and 'ifspeed' is MIB group 302b and 'ifStateChgId' is an ACI of MIB groups 302a and 302b. The ACI of MIB groups 302a and 302b is equal to the ACI of MIB object instances 204 of MIB groups 302a and 302b. MIB groups 302a and 302b are polled by NMS 104. NMS 104 receives the ACI of the MIB object instances 204 in response to a poll request. If a change is detected in the ACI of the MIB object instances 204, then, NMS 104 polls MIB object instances 204. The changes in the MIB object instances 204 reflect the changes in network device 102a and network 100.

In accordance with an embodiment of the present invention, the sensitivity of NMS 104 to changes in network 100 is increased without increasing the traffic in network 100. Sensitivity is defined as the rate at which NMS 104 responds to changes in network 100. Further, sensitivity depends on rate of polling of network devices 102 by NMS 104. For example, if NMS 104 takes 30 minutes to poll each of MIB object instances 204, then NMS 104 can start next polling only after completion of polling of each of MIB object instances 204. As a result, the rate at which the changes are detected in network devices 102 depends on the rate of polling each of MIB object instances 204. When NMS 104 polls MIB groups 302 or 304, the time taken by NMS 104 to detect the changes in network 100 is considerably reduced and thus sensitivity of NMS 104 to changes in network 100 is increased.

In accordance with another embodiment of the present invention, the SNMP polling between NMS 104 and SNMP agent 202 is optimized, as the number of MIB object instances 204 polled is almost proportional to the number of changes in network 100.

In accordance with another embodiment of the present invention, NMS 104 is updated about the changes in network 100 by periodically detecting changes in MIB object instances 204.

In accordance with another embodiment of the present invention, MIB object instances 204 of MIB group 302a are polled by NMS 104 if a change is detected in MIB group 302a.

In accordance with an embodiment of the present invention, MIB groups 302 are polled to detect the changed MIB group 302a.

In accordance with an embodiment of the present invention, only those MIB object instances 204 are allowed to be grouped to form MIB groups 302 and 304 that satisfy certain conditions of grouping, thereby, increasing the efficiency of SNMP polling.

In accordance with an embodiment of the present invention, a multi-level hierarchy of MIB object instances 204 and MIB groups 302 and 304 helps in localizing the changed MIB object instances 204 easily.

In accordance with an embodiment of the present invention, NMS 104 stores the received ACIs for future references.

In accordance with an embodiment of the present invention, the tabular MIB object includes MIB groups 302, wherein MIB groups 302 are formed for easy detection of the changed MIB object instances 204.

In accordance with an embodiment of the present invention, a user can configure MIB groups 302 and 304.

In accordance with an embodiment of the present invention, the 'dirty information' can be used for computing an incremental checksum instead of repeatedly computing checksum on MIB groups 302 and 304.

In accordance with an embodiment of the present invention, a method for detecting changes in a network for updating a Network Management Station (NMS), the network comprising the NMS and network devices, each of the network devices comprising a Simple Network Management Protocol (SNMP) agent and Management Information Base (MIB) objects is provided. The method comprising polling an MIB group periodically, the MIB group is formed by grouping MIB object instances; and polling the MIB object instances of the MIB group if a change is detected in an Aggregate Change Identifier (ACI) of the MIB group.

In accordance with another embodiment of the present invention, a method for detecting changes in a network for updating a Network Management Station (NMS), the network comprising the NMS and network devices, each of the network devices comprising a Simple Network Management Protocol (SNMP) agent and Management Information Base (MIB) objects is provided. The method comprising computing an ACI of an MIB group, the MIB group is formed by grouping MIB object instances; and sending the computed ACI to the NMS in response to a request for the MIB group, wherein the request is made by the NMS.

In accordance with an embodiment of the present invention, a system for detecting changes in a network for updating a Network Management Station (NMS), the network comprising the NMS and network devices, each of the network devices comprising a Simple Network Management Protocol (SNMP) agent and Management Information Base (MIB) objects is provided. The system comprising means for polling an MIB group periodically, the MIB group is formed by grouping MIB object instances; and means for polling the MIB object instances of the MIB group if a change is detected in an Aggregate Change Identifier (ACI) of the MIB group.

In accordance with another embodiment of the present invention, a system for detecting changes in a network for updating a Network Management Station (NMS), the network comprising the NMS and network devices, each of the network devices comprising a Simple Network Management Protocol (SNMP) agent and Management Information Base (MIB) objects is provided. The system comprising means for computing an ACI of an MIB group, the MIB group is formed by grouping MIB object instances; and means for sending the computed ACI to the NMS in response to a request for the MIB group, wherein the request is made by the NMS.

An embodiment of the present invention provides a machine-readable medium that includes instructions executable by a computer processor. One or more of these instructions compute an ACI of an MIB group, the MIB group is formed by grouping MIB object instances. Other instructions send the computed ACI to the NMS in response to a request for the MIB group, wherein the request is made by the NMS.

An embodiment of the present invention provides a machine-readable medium that includes instructions executable by a computer processor. One or more of these instructions periodically poll an MIB group, the MIB group is formed by grouping MIB object instances. Other instructions poll the MIB object instances of the MIB group if a change is detected in an Aggregate Change Identifier (ACI) of the MIB group.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. As a result, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    accessing management information base (MIB) object instance update frequency information reflecting frequency of updates to values maintained for MIB object instances during operation of a network device;
    selecting, based on at least the accessed MIB object instance update frequency information, a subset of less than all MIB object instances that are updated within the MIB during operation of the network device;
    populating, at the network device, an MIB sub-group with identifiers corresponding to MIB object instances within the selected subset of less than all MIB object instances that are updated within the MIB during operation of the network device;
    determining whether changes are made to the MIB object instances for which corresponding identifiers are populated to the MIB sub-group;
    computing, for the MIB sub-group, an aggregate change identifier (ACI) that is related to a state of object instances corresponding to identifiers within the MIB sub-group,
    comparing the computed ACI against an ACI previously computed for the MIB sub-group;
    determining whether change has occurred in the ACIs computed for the MIB sub-group; and
    evaluating information within the MIB object instances corresponding to identifiers within the MIB sub-group based on whether a change has been determined to exist in the ACIs computed for the MIB sub-group, wherein the change in the ACI indicates a change in at least one MIB object instance in the MIB sub-group.

2. The method of claim 1, wherein the ACI is computed based on at least one of a timestamp of the MIB sub-group, a checksum of the MIB sub-group, and a combination of the number of MIB object instances in an MIB sub-group and the checksum of the corresponding MIB sub-group.

3. The method of claim 2, wherein the checksum is an incremental checksum.

4. The method of claim 1, wherein the MIB object instances are polled using simple network management protocol (SNMP) polling for determining changes in the network.

5. The method of claim 1, further comprising not grouping MIB object instances whose values often change during the operation of the network device.

6. A method comprising:
    accessing management information base (MIB) object instance update frequency information reflecting frequency of updates to values maintained for MIB object instances during operation of a network device;
    selecting, based on at least the accessed MIB object instance update frequency information, a subset of less than all MIB object instances that are updated within the MIB during operation of the network device;
    populating, at the network device, plural management information base (MIB) sub-groups based on at least one characteristic respectively shared by constituent MIB object instances;
    receiving a poll request corresponding to a MIB sub-group;
    computing an aggregate change identifier (ACI) for the polled MIB sub-group, wherein the MIB sub-group is formed by grouping MIB object instances, wherein a given MIB object instance is included in the MIB sub-group if (1) at least one change in the MIB object instance is due to a configuration change in a network device associated with the MIB object instance, (2) the given MIB object instance does not change during operation of a network device; and
    sending the computed ACI to a network management station (NMS) in response to a request for the MIB sub-group, wherein the request is made by the NMS.

7. The method of claim 6, wherein the network device includes a multi-level hierarchy of MIB sub-groups.

8. The method of claim 6, wherein the MIB object are grouped if the MIB object instances change due to at least one of: configuration change of the network device, behavioral change of the network device, and response of the network device to a change in a network.

9. The method of claim 6, wherein the MIB sub-group is formed by grouping a predefined number of MIB object instances, the MIB object instances forming a tabular MIB object.

10. The method of claim 9, wherein the ACIs of the tabular MIB object are defined on the basis of the predefined number.

11. The method of claim 9, wherein the predefined number is a table compression factor.

12. A system comprising:
    means for accessing management information base (MIB) object instance update frequency information reflecting frequency of updates to values maintained for MIB object instances during operation of a network device;
    means for selecting, based on at least the accessed MIB object instance update frequency information, a subset of less than all MIB object instances that are updated within the MIB during operation of the network device;
    means for populating, at a network device, an MIB sub-group with identifiers corresponding to object instances within the selected subset of less than all MIB object instances that are updated within the MIB during operation of the network device;

means for determining whether changes are made to object instances for which corresponding identifiers are populated to the MIB sub-group;

means for computing, for the MIB sub-group, an aggregate change identifier (ACI) that is related to a state of object instances corresponding to identifiers within the MIB sub-group;

means for comparing the computed ACI against an ACI previously computed for the MIB sub-group;

means for determining whether change has occurred in the ACIs computed for the MIB sub-group; and means for evaluating information within the MIB object instances corresponding to identifiers within of the MIB sub-group based on whether a change has been determined to exist in the ACIs computed for the MIB sub-group, wherein the change in the ACI indicates a change in at least one MIB object instance in the MIB sub-group.

13. The system of claim 12, further comprising means for not grouping MIB object instances whose values often change during the operation of the network device.

14. A system comprising:

means for accessing management information base (MIB) object instance update frequency information reflecting frequency of updates to values maintained for MIB object instances during operation of a network device;

means for selecting, based on at least the accessed MIB object instance update frequency information, a subset of less than all MIB object instances that are updated within the MIB during operation of the network device;

means for populating, at the network device, plural management information base (MIB) sub-groups based on at least one characteristic respectively shared by constituent MIB object instances;

means for receiving a poll request corresponding to a MIB sub-group;

means for computing an aggregate change identifier (ACI) for the polled MIB sub-group, wherein the MIB sub-group is formed by grouping MIB object instances, wherein a given MIB object instance is included in the MIB sub-group if (1) at least one change in the MIB object instance does not depend on time, (2) the given MIB object instance does not change during operation of a network device; and means for sending the computed ACI to a network management station (NMS) in response to a request for the MIB sub-group, wherein the request is made by the NMS.

15. A non-transitory machine-readable medium including instructions executable by a processor, the machine-readable medium comprising one or more instructions that when executed on the processor cause the processor to perform operations that include:

accessing management information base (MIB) object instance update frequency information reflecting frequency of updates to values maintained for MIB object instances during operation of a network device;

selecting, based on at least the accessed MIB object instance update frequency information, a subset of less than all MIB object instances that are updated within the MIB during operation of the network device;

populating, at the network device, an MIB sub-group with identifiers corresponding to object instances within the selected subset of less than all MIB object instances that are updated within the MIB during operation of the network device;

determining whether changes are made to object instances for which corresponding identifiers are populated to the MIB sub-group;

computing, for the MIB sub-group, an aggregate change identifier (ACI) that is related to a state of object instances corresponding to identifiers within the MIB sub-group;

comparing the computed ACI against an ACI previously computed for the MIB sub- group;

determining whether change has occurred in the ACIs computed for the MIB sub-group; and evaluating information within the MIB object instances corresponding to identifiers within of the MIB sub-group based on whether a change has been determined to exist in the ACIs computed for the MIB sub-group, wherein the change in the ACI indicates a change in at least one MIB object instance in the MIB sub-group.

16. A non-transitory machine-readable medium of claim 15, further comprising operations for not grouping MIB object instances whose values often change during the operation of the network device.

17. A non-transitory machine-readable medium including instructions executable by a processor, the non-transitory machine-readable medium comprising one or more instructions that when executed on the processor cause the processor to perform operations that include:

accessing management information base (MIB) object instance update frequency information reflecting frequency of updates to values maintained for MIB object instances during operation of a network device;

selecting, based on at least the accessed MIB object instance update frequency information, a subset of less than all MIB object instances that are updated within the MIB during operation of the network device;

populating plural management information base (MIB) sub-groups based on at least one characteristic respectively shared by constituent MIB object instances;

receiving a poll request corresponding to a MIB sub-group;

computing an aggregate change identifier (ACI) for the polled MIB sub-group, wherein the MIB sub-group is formed by grouping MIB object instances, wherein a given MIB object instance is included in the MIB sub-group if (1) at least one change in the MIB object instance does not depend on time, (2) the given MIB object instance does not change during operation of a network device; and sending the computed ACI to a network management station (NMS) in response to a request for the MIB sub-group, wherein the request is made by the NMS.

* * * * *